(12) United States Patent
Zhu et al.

(10) Patent No.: US 9,904,150 B1
(45) Date of Patent: Feb. 27, 2018

(54) TRANSMISSION MODE FAST-CONVERSION STRUCTURE FOR PHOTOGRAPHIC SLIDING RAIL

(71) Applicant: Zhongshan Dashan Photographic Equipment Co., Ltd., Zhongshan, Guangdong (CN)

(72) Inventors: Xihua Zhu, Guangdong (CN); Shuang Xiao, Guangdong (CN)

(73) Assignee: Zhongshan Dashan Photographic Equipment Co., Ltd., Zhongshan (CN)

(*) Notice: Subject to any disclaimer, the term of this patent is extended or adjusted under 35 U.S.C. 154(b) by 0 days.

(21) Appl. No.: 15/588,733

(22) Filed: May 8, 2017

Related U.S. Application Data

(63) Continuation of application No. PCT/CN2017/075095, filed on Feb. 28, 2017.

(30) Foreign Application Priority Data

Feb. 9, 2017 (CN) .......................... 2017 1 0071821

(51) Int. Cl.
| | | |
|---|---|---|
| G03B 17/00 | (2006.01) | |
| G03B 17/56 | (2006.01) | |
| F16M 13/02 | (2006.01) | |
| F16M 11/20 | (2006.01) | |
| F16M 11/42 | (2006.01) | |

(52) U.S. Cl.
CPC ....... *G03B 17/561* (2013.01); *F16M 11/2085* (2013.01); *F16M 11/425* (2013.01); *F16M 13/022* (2013.01)

(58) Field of Classification Search
USPC ...... 396/419, 428; 348/373, 375; 248/176.3, 248/186.1, 186.2, 187.1
See application file for complete search history.

(56) References Cited

U.S. PATENT DOCUMENTS

| 3,731,897 A * | 5/1973 | Price ..................... F16M 13/02 248/229.1 |
| 6,116,485 A * | 9/2000 | Watkins ................. B60R 11/04 224/275 |

\* cited by examiner

*Primary Examiner* — Clayton E LaBalle
*Assistant Examiner* — Warren K Fenwick

(57) ABSTRACT

A transmission mode fast-conversion structure for a photographic sliding rail comprises an elongated rail, bracket modules mounted on two ends of the rail, a sliding block module sliding on the rail, a sliding block transmission structure, a flywheel module and an electric module; both the electric module and the flywheel module are provided with a claw disc coupling capable of being engaged with a claw disc type coupling of the sliding block transmission structure and a securing buckle inserted into and buckled with a lock catch structure in the sliding block module. in this way, transmission mode conversion can be achieved by way of plugging and pulling, so that there is no need to loosen screws to demount the original flywheel or electric module before mounting a new electric or flywheel module and to tighten the screws finally.

9 Claims, 11 Drawing Sheets

TRANSMISSION MODE FAST-CONVERSION STRUCTURE FOR PHOTOGRAPHIC SLIDING RAIL

CROSS REFERENCE TO RELATED APPLICATIONS

This application is a continuation of PCT Application No. PCT/CN2017/075095, filed on Feb. 28, 2017, which claims priority to Chinese Patent Application No. 201710071821.8, filed on Feb. 9, 2017, the entire contents of which are incorporated herein by reference.

TECHNICAL FIELD

The present invention relates to photographic equipments, and in particular to a photographic sliding rail.

BACKGROUND

We know current photographic sliding rails available on the market mainly includes pure manual mode, pure automatic mode, and manual plus automatic mode which can operate both manually or automatically. As to the pure manual mode sliding rail, a flywheel is probably needed to store energy to make sliding smoothly. As to the pure automatic mode, a motor driven by an inbuilt battery or an external mains supply is required to drive a sliding block to slide. As to the photographic sliding rail of the manual plus automatic mode, a specialized conversion structure is required to install a flywheel module and an electric module. At present, the photographic sliding rail of the manual plus automatic mode employs a transmission mode adopting a transmission belt such as leather belt or synchronous belt. When switching between the flywheel module and the electric module, it is needed to demount and mount many parts, which makes the demounting and mounting cumbersome and inconvenient when converting the transmission mode. In addition, belt transmission is liable to generate vibration during operation, thereby impacting the photographic effect. Moreover, the length of the transmission belt such as leather belt or synchronous belt is non-adjustable, it is troublesome and time-consuming when the photographic sliding rail needs to connect with or reduce one or more pieces of rails to increase or shorten the rail length so as to be carried conveniently and meet the photographic requirements, because it is needed to loosen screws first to take out original parts such as transmission belt, then connect rail(s) of desired length, and finally mount a new transmission belt and tighten the screws and so on. Therefore, the applicant makes an improvement to the photographic sliding rail of the manual plus automatic mode.

SUMMARY

The present invention aims to overcome the drawbacks in existing technologies, and provide a conversion structure for a photographic sliding rail, which is more reasonable in structure and is more convenient and faster in transmission mode conversion.

In order to solve the above existing technical problem, the disclosure adopts a technical scheme as follows:

A transmission mode fast-conversion structure for a photographic sliding rail includes an elongated rail, bracket modules mounted on two ends of the rail, a sliding block module slidable on the rail, a sliding block transmission structure, a flywheel module and an electric module, wherein a flywheel lock catch structure and an electric module lock catch structure are arranged in the front side surface of the sliding block module;

the sliding block transmission structure is arranged in the sliding block module and includes a gear rack arranged on the bottom surface of the rail, a gearbox arranged inside the sliding block module, and a gear exposed to the outside of the bottom part of the gearbox and engaged with the gear rack; an output shaft of the gearbox is exposed to an open slot of the sliding block module and mounted with a claw disc type gearbox coupling;

a claw disc type flywheel coupling capable of being engaged with and butting with the claw disc of the gearbox coupling is provided on the flywheel module; a flywheel securing buckle capable of being buckled with the flywheel lock catch structure is arranged on a side of the flywheel module opposite to the sliding block module;

a claw disc type electric coupling capable of being engaged with and butting with the claw disc of the gearbox coupling is provided on a driving shaft of the electric module; an electric module securing buckle capable of being buckled with the electric module lock catch structure is arranged on a surface of the electric module just opposite to the sliding block module.

In a modified embodiment of the transmission mode fast-conversion structure for a photographic sliding rail, the flywheel lock catch structure includes a flywheel securing buckle lock pin and a flywheel securing buckle lock pin reset spring for making the flywheel securing buckle lock pin reset outwardly; the flywheel securing buckle lock pin and the flywheel securing buckle lock pin reset spring are arranged in a transverse slot of the sliding block module; a front side surface of the sliding block module defines a flywheel securing buckle insertion hole allowing the flywheel securing buckle to insert to hook the flywheel securing buckle lock pin.

In a modified embodiment of the transmission mode fast-conversion structure for a photographic sliding rail, the electric module lock catch structure includes an electric module lock hook horizontally swingingly connected to the sliding block module and a lock hook reset spring.

In a modified embodiment of the transmission mode fast-conversion structure for a photographic sliding rail, the rail is formed by butting at least two sections of rail units, the gear rack is divided into sections that are respectively arranged on the rail unit, the gear racks on the opposite ends of adjacent rail units are butted together; adjacent rail units are butted together through at least two pairs of male-female butt joints engaged together; and at least two pairs of male-female butt buckles are further provided on adjacent rail units.

In an modified embodiment of the transmission mode fast-conversion structure for a photographic sliding rail, the bracket module is connected with the rail through the male-female butt joints and the male-female butt buckles.

Compared with the existing technologies, the present invention has the advantages as follows: since on both the electric module and the flywheel module are provided the claw disc coupling capable of being engaged with the claw disc type coupling of the sliding block transmission structure and provided the securing buckle inserted into and buckled with the lock catch structure in the sliding block module, transmission mode conversion can be achieved by way of plugging and pulling, so that there is no need to loosen screws to demount the original flywheel or electric module before mounting a new electric or flywheel module and to tighten the screws finally. Therefore, the present invention is more reasonable in structure, and is more convenient and faster in transmission mode conversion; in addition, compared with the transmission mode adopting a transmission belt, the transmission mode adopting the gear and gear rack is quicker and simpler in demounting and maintaining.

BRIEF DESCRIPTION OF THE DRAWINGS

The present invention is described below in further detail in conjunction with accompanying drawings and specific embodiments.

DETAILED DESCRIPTION

Figure 1:
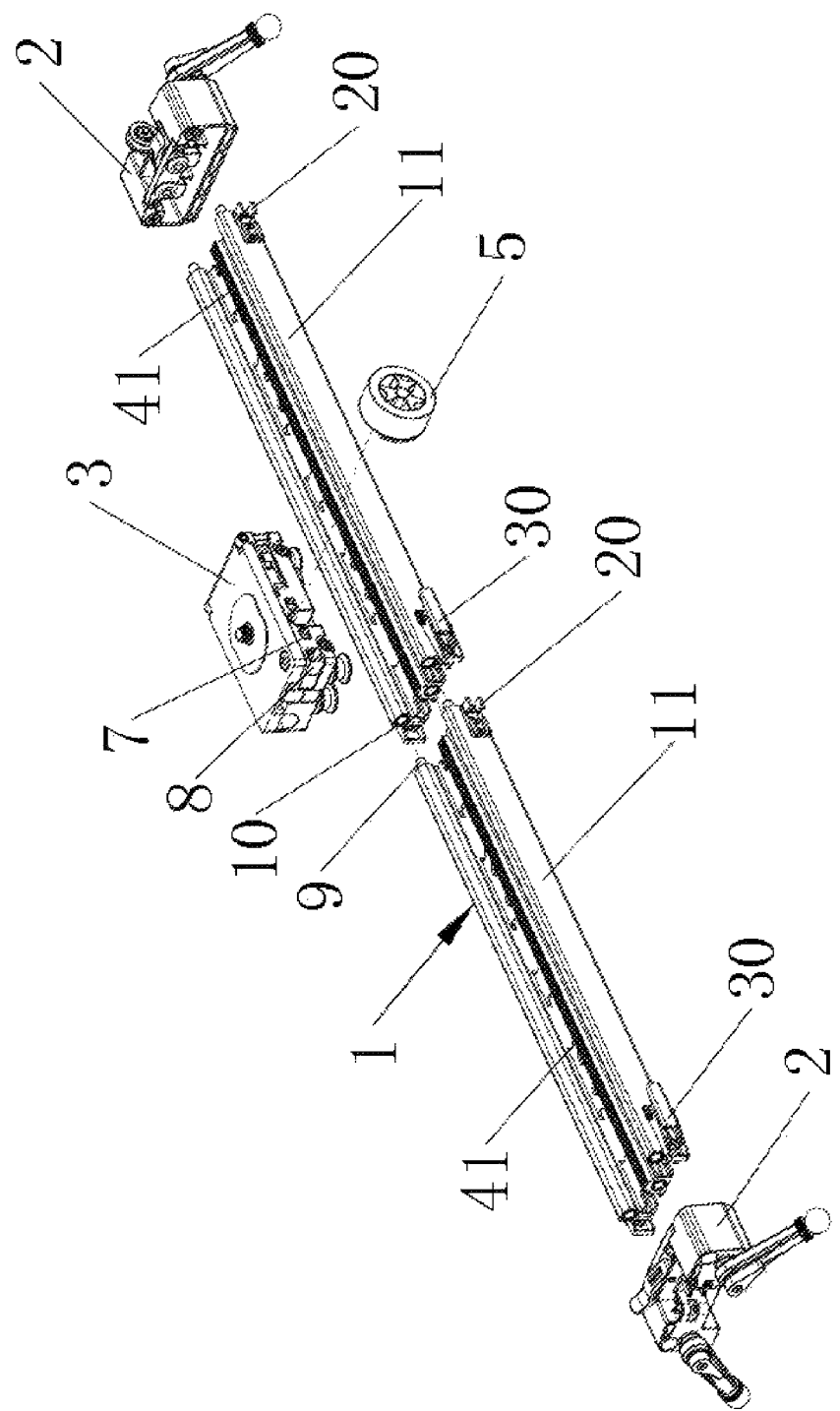
FIG. 1 is a first assembly diagram of each main module of the embodiment of the disclosure (assembled into the manual mode).
Figure 2:
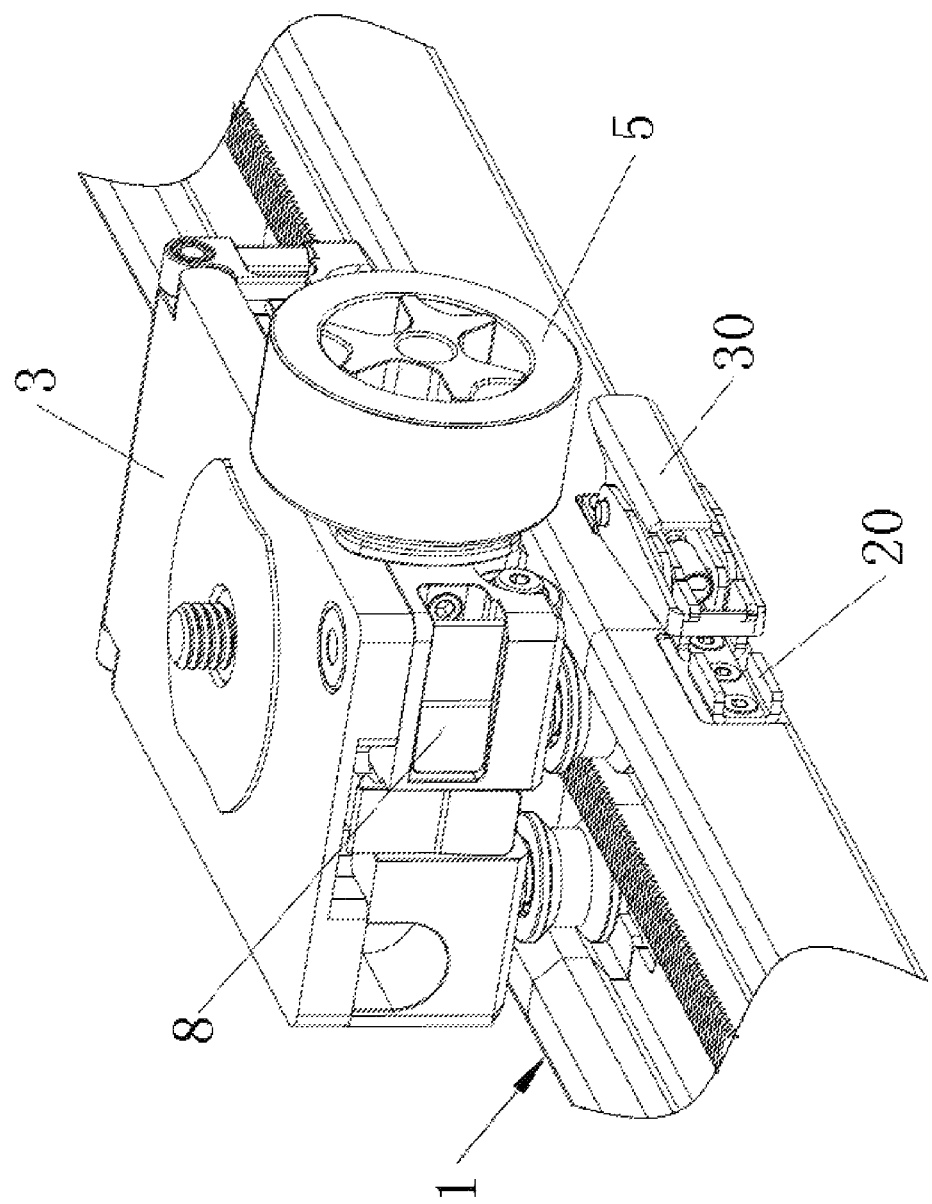
FIG. 2 is a perspective view of a flywheel when the embodiment of the present invention is converted into the manual mode.
Figure 3:
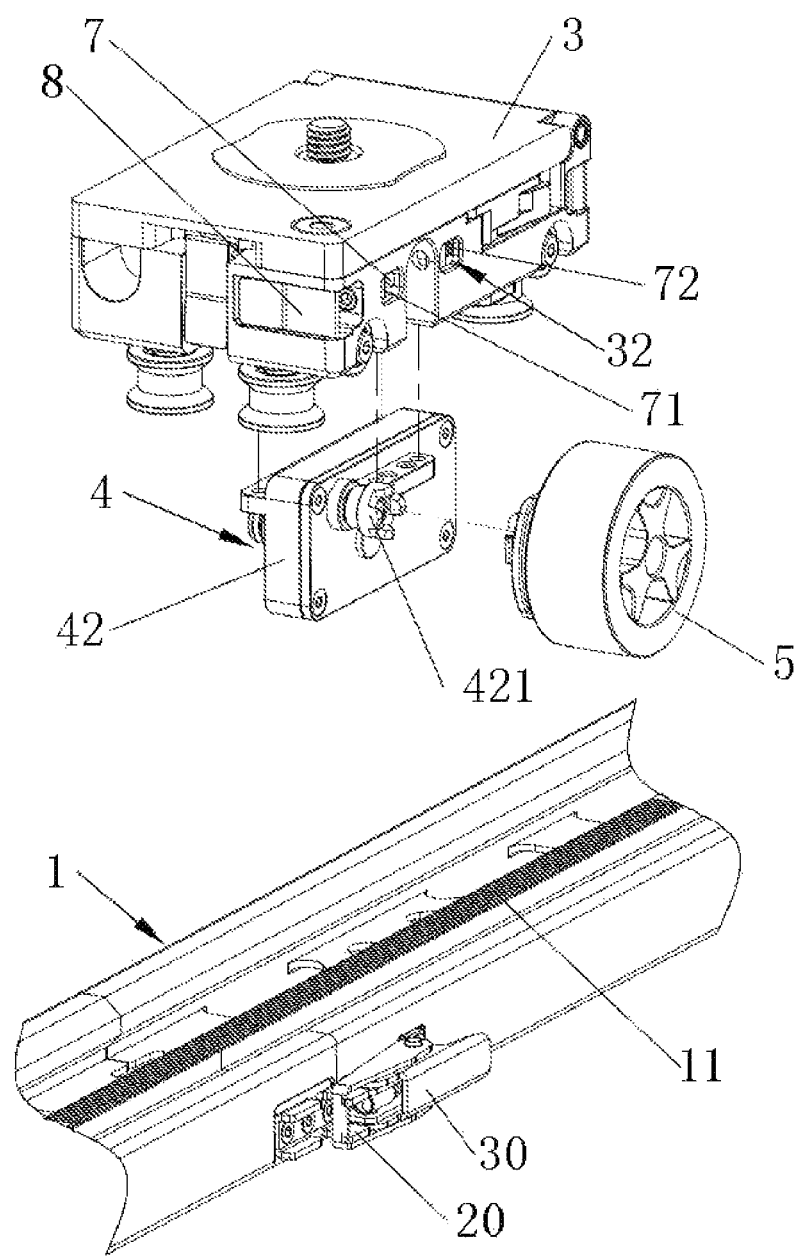
FIG. 3 is a first partial assembly diagram when the embodiment of the present invention is converted into the manual mode.
Figure 4:
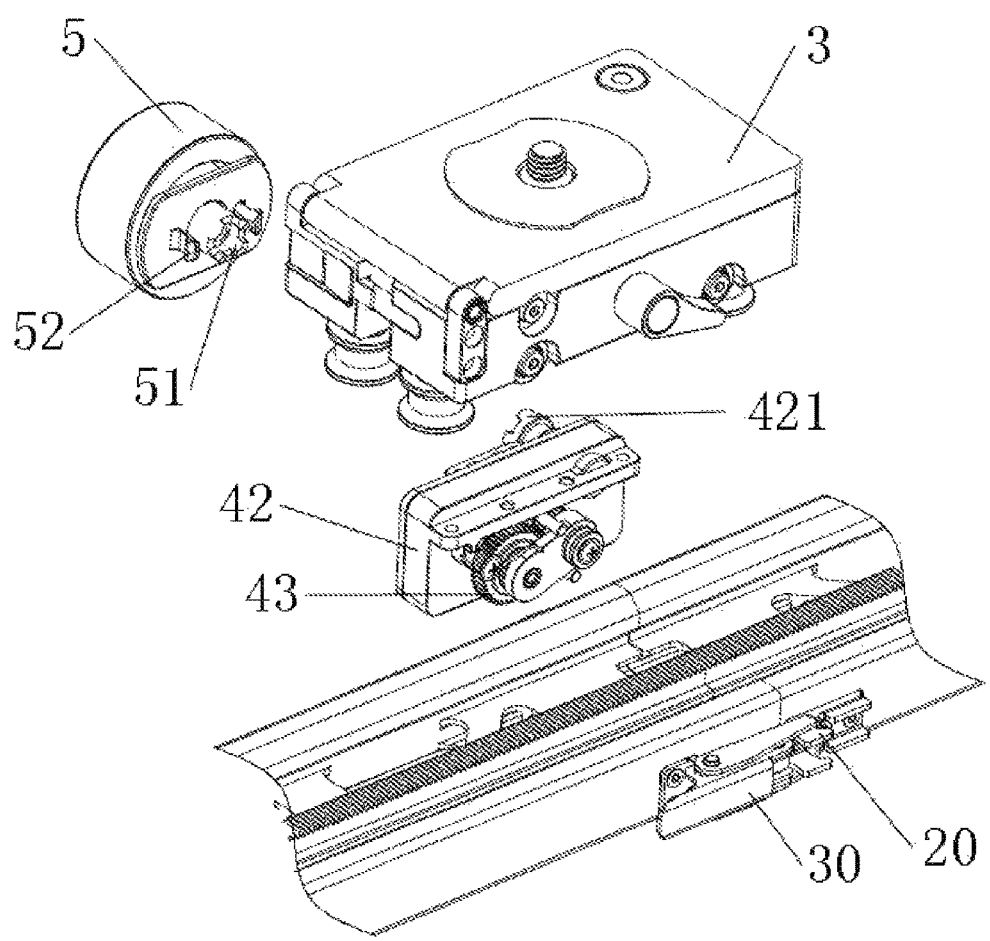
FIG. 4 is a second partial assembly diagram when the embodiment of the present invention is converted into the manual mode.

The present invention is a transmission mode fast-conversion structure for a photographic sliding rail, as shown in FIG. 1 to FIG. 10, which includes an elongated rail 1, bracket modules 2 mounted on two ends of the rail 1, a sliding block module 3 slidable on the rail 1, a sliding block transmission structure 4, a flywheel module 5 and an electric module 6, wherein a flywheel lock catch structure 7 and an electric module lock catch structure 8 are arranged in the front side surface of the sliding block module 3;

the sliding block transmission structure 4 is arranged in the sliding block module 3 and includes a gear rack 41 arranged on the bottom surface of the rail 1, a gearbox 42 arranged inside the sliding block module 3, and a gear 43 exposed to the outside of the bottom part of the gearbox 42 and engaged with the gear rack 41; compared with the transmission mode adopting a transmission belt, the transmission mode adopting the gear and gear rack is quicker and simpler in demounting and maintaining; an output shaft of the gearbox 42 is exposed to an open slot of the sliding block module 3 and mounted with a claw disc type gearbox coupling 421;

a claw disc type flywheel coupling 51 capable of being engaged with and butting with the claw disc of the gearbox coupling 421 is provided on the flywheel module 5; a flywheel securing buckle 52 capable of being buckled with the flywheel lock catch structure 7 is arranged on a side of the flywheel module 5 just opposite to the sliding block module 3, as shown in FIG. 3 and FIG. 4;

a claw disc type electric coupling 61 capable of being engaged with and butting with the claw disc of the gearbox coupling 421 is provided on a drive shaft of the electric module 6; an electric module securing buckle 62 capable of being buckled with the electric module lock catch structure 8 is arranged on a surface of the electric module 6 just opposite to the sliding block module 3; a motor and a power supply are arranged in the electric module, which is similar to current electric modules, and will not be described in detail here.

When the present converts between manual transmission and electric transmission, it is only needed to pull out the flywheel module 5 or the electric module 6 from the sliding block module 3, and then insert the electric coupling 61 of the electric module 6 or the flywheel coupling 51 of the flywheel module 5 into the gearbox coupling 421 after alignment, at this time the electric module securing buckle 62 or the flywheel securing buckle 52 are also inserted into the electric module lock catch structure 8 or the flywheel lock catch structure 7 in the sliding block module 3. When the claw discs of the butted couplings are engaged together, the securing buckles are hooked with the lock catch structures, thus the conversion of transmission mode is completed. From the above, it can be seen that the present invention may conduct transmission mode conversion by way of plugging and pulling, so that there is no need to loosen screws to demount the original flywheel or electric module before mounting a new electric or flywheel module and tighten the screws finally. Therefore, the present invention is more reasonable in structure, and is more convenient and faster in transmission mode conversion; in addition, compared with the transmission mode adopting a transmission belt, the transmission mode adopting the gear and gear rack is quicker and simpler in demounting and maintaining.

Figure 5:
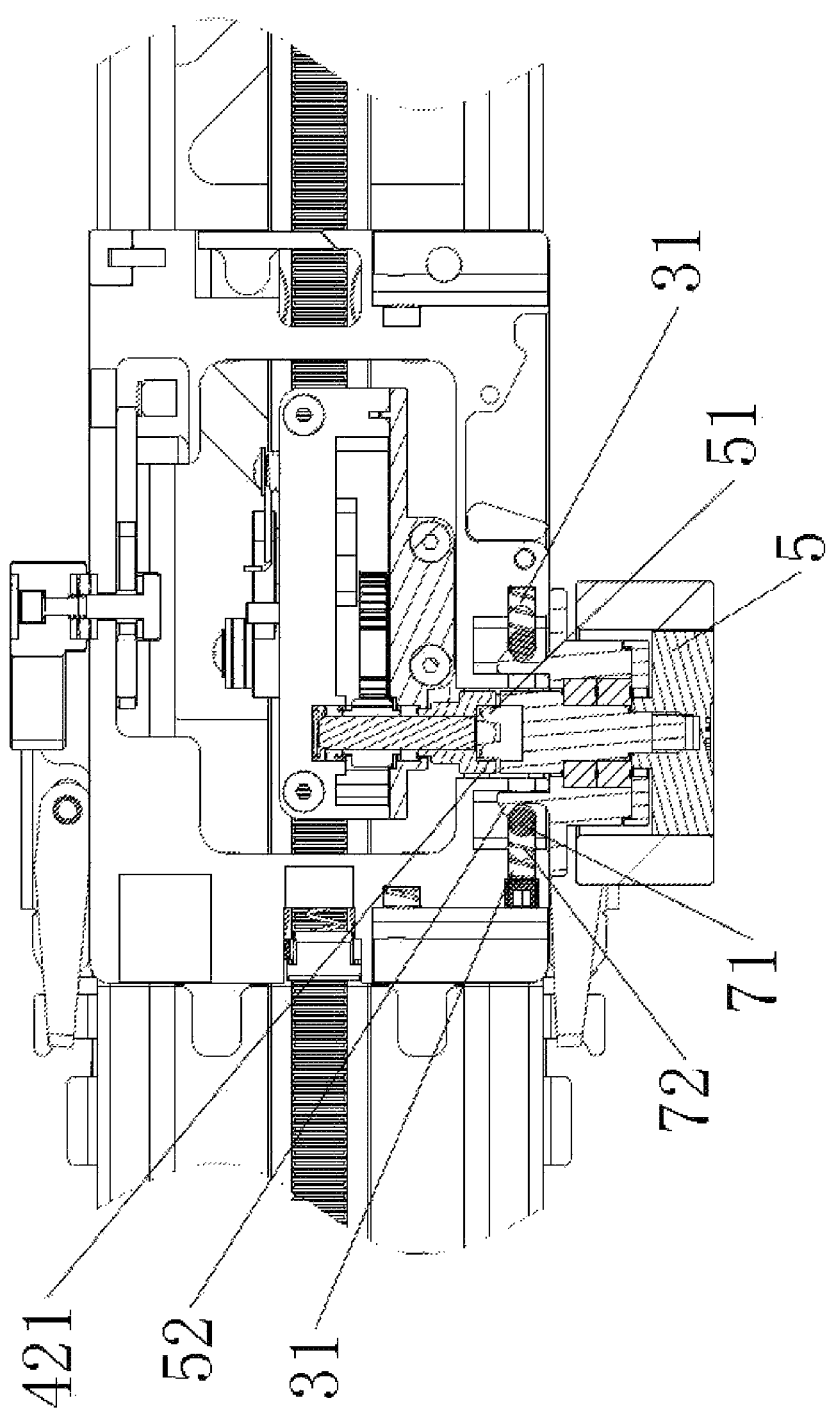
FIG. 5 is a structure diagram of a flywheel when the embodiment of the present invention is converted into the manual mode.
Figure 8:
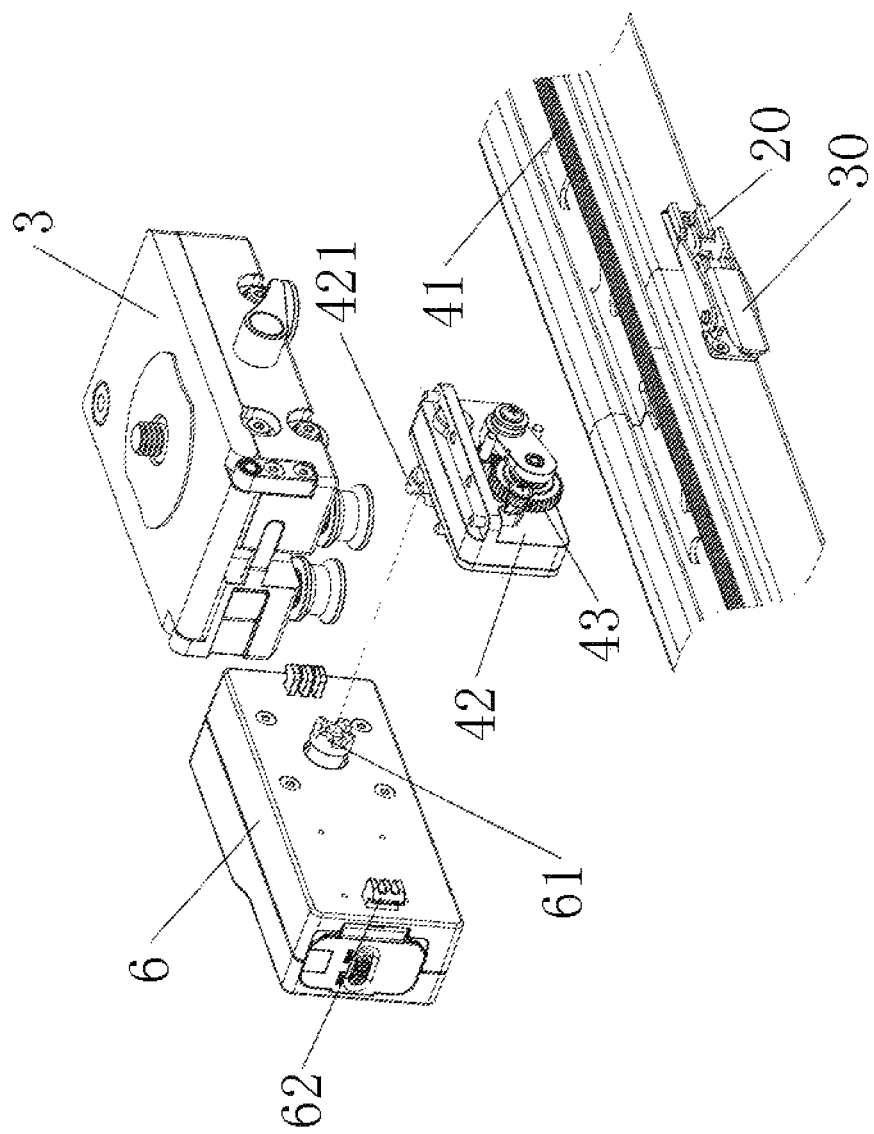
FIG. 8 is a first partial assembly diagram when the embodiment of the disclosure is converted into the automatic mode.
Figure 9:
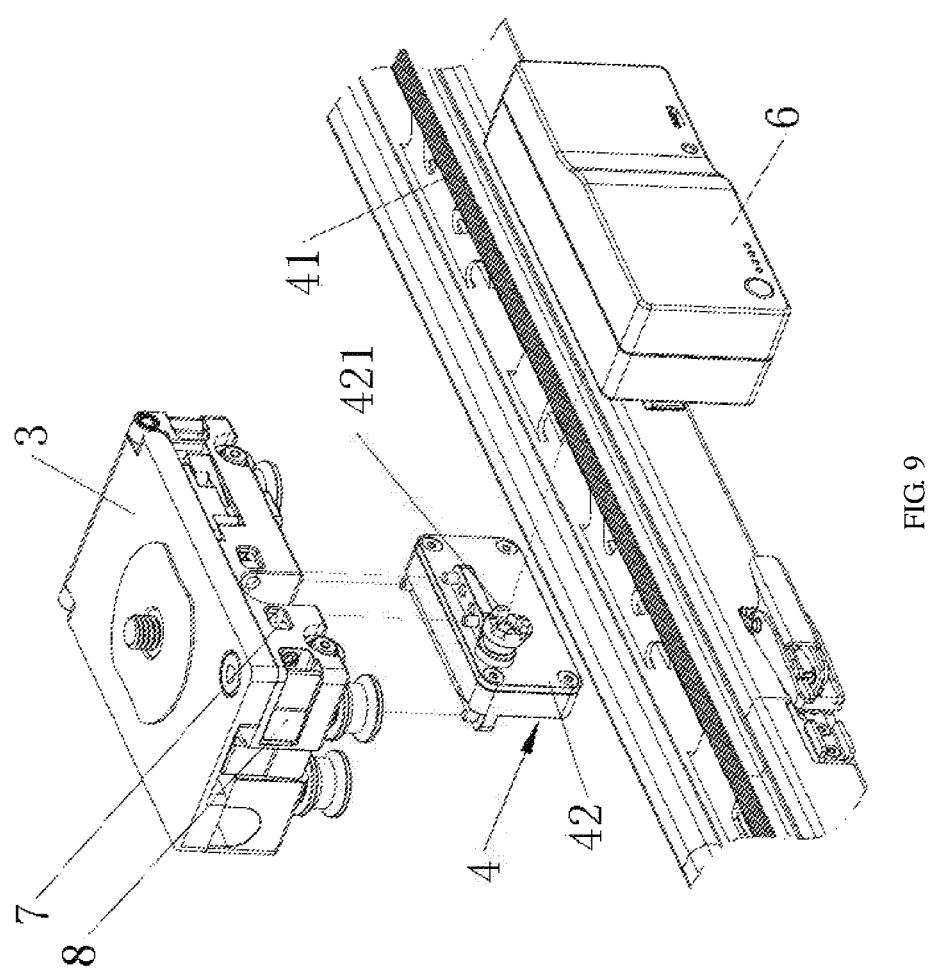
FIG. 9 is a second partial assembly diagram when the embodiment of the present invention is converted into the automatic mode.
Figure 10:
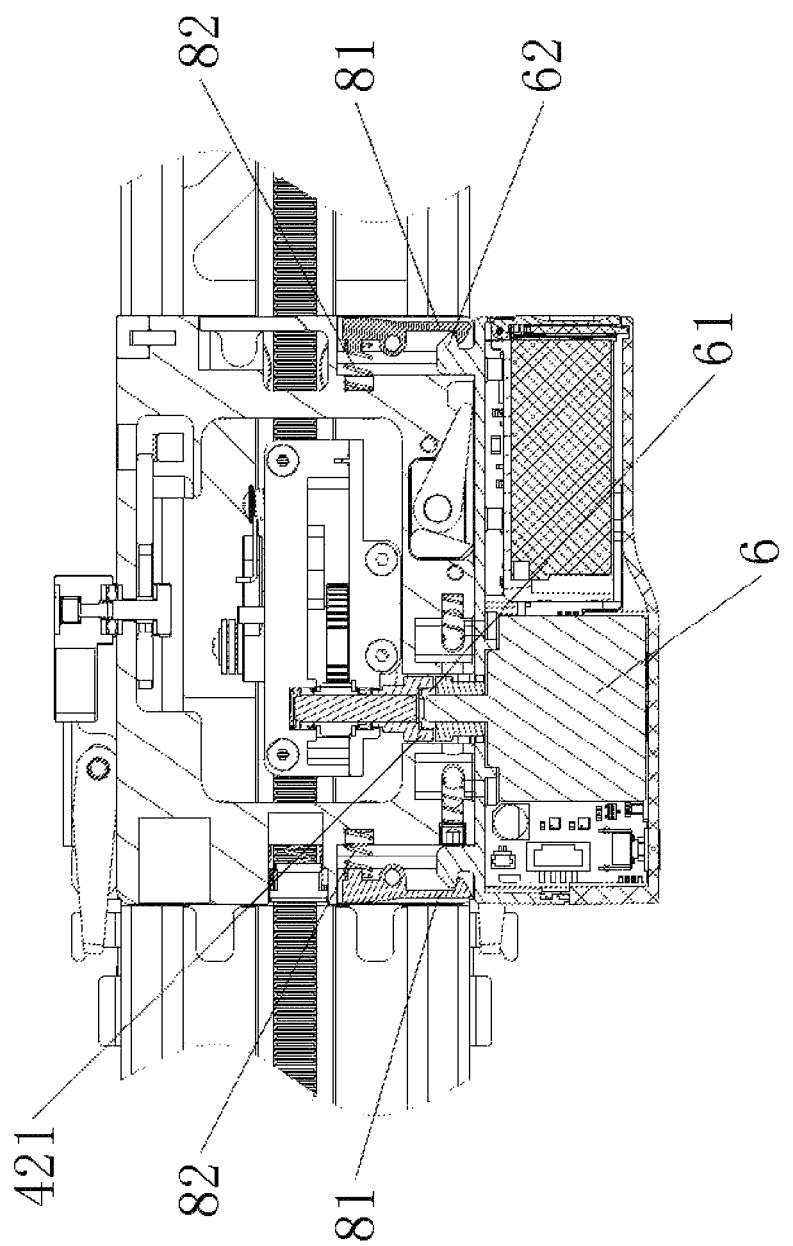
FIG. 10 is a structure diagram of an electric module when the embodiment of the present invention is converted into the manual mode.

Since the principle of the flywheel lock catch structure 7 is the same as the principle of electric module lock catch structure 8, i.e., both are hook buckling mode, thus the flywheel lock catch structure 7 and the electric module lock catch structure 8 may share one set of structure. In this embodiment, since the electric module is wider in shape and the flywheel module is smaller in shape, the flywheel lock catch structure 7 and the electric module lock catch structure 8 are designed so as to not share one set of structure, for better locking respective modules. As shown in FIG. 3 to FIG. 5, there are two sets of flywheel lock catch structures 7, each including a flywheel securing buckle lock pin 71 and a flywheel securing buckle lock pin reset spring 72 for making the flywheel securing buckle lock pin 71 reset outwardly. The flywheel securing buckle lock pin 71 and the flywheel securing buckle lock pin reset spring 72 are arranged in a transverse slot 31 of the sliding block module 3. a front side surface of the sliding block module 3 defines a flywheel securing buckle insertion hole 32 allowing the flywheel securing buckle 52 to insert to hook the flywheel securing buckle lock pin 71. As shown in FIG. 8 to FIG. 10, there are two sets of electric module lock catch structures 8, each including an electric module lock hook 81 horizontally swingingly connected on the sliding block module 3 and a lock hook reset spring 82. When to plug or pull the electric module, press the electric module lock hook 81 using a hand to open the electric module lock hook 81, then the securing buckle of the electric module can be inserted or pulled out, and then release the electric module lock hook 81.

One single rail unit 11 may be adopted. In order to carry the photographic sliding rail conveniently the length of the photographic sliding rail can be adjusted as needed. Preferably, the rail unit is designed in a multi-section structure. Therefore, the rail 1 is formed by butting at least two sections of rail units 11. The gear rack 41 is divided into a plurality of sections that are respectively arranged on the rail units 11. the gear racks on the opposite ends of adjacent rail units 11 are butted together. In this way, the rail is not as troublesome or labor-consuming as currently available photographic sliding rails capable of increasing and shortening rail length, in which the rail length is adjusted by loosening a plurality of screws and demounting and replacing transmission belts of different lengths, thus the present invention is more convenient in use. Adjacent rail units 11 are butted together through at least two pairs of male-female butt joints 9, 10 respectively engaged together (three pairs in this embodiment); and two pairs of male-female butt buckles 20, 30 are further arranged on adjacent rail units 11, as shown in FIG. 11, in this way, when all the male-female butt joints 9, 10 between adjacent rail units are engaged together, the gear racks at the abutting ends of the rail units are exactly butted together, then, it is only needed to fasten them by using the male-female butt buckles 20, 30.

Figure 6:
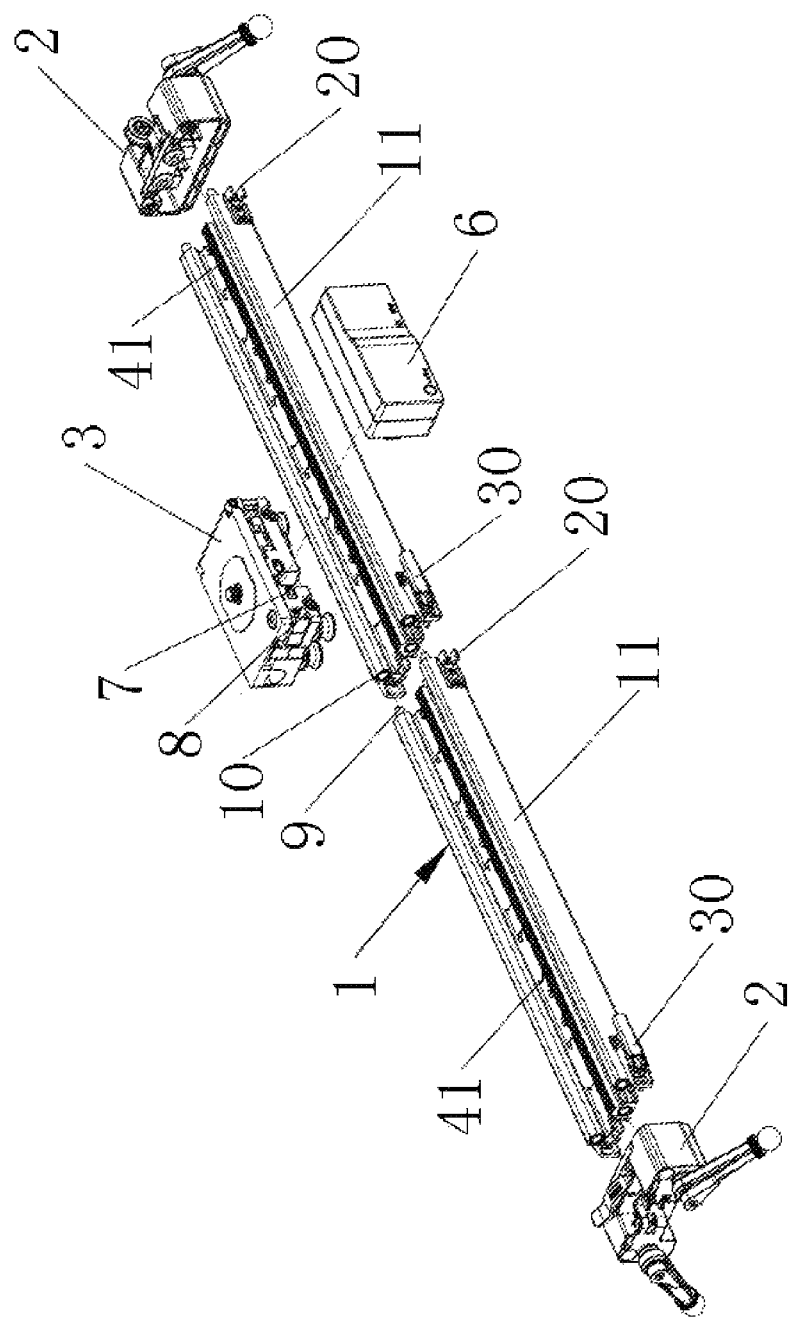
FIG. 6 is a first assembly diagram of each main module of the embodiment of the disclosure (assembled into the automatic mode).
Figure 7:
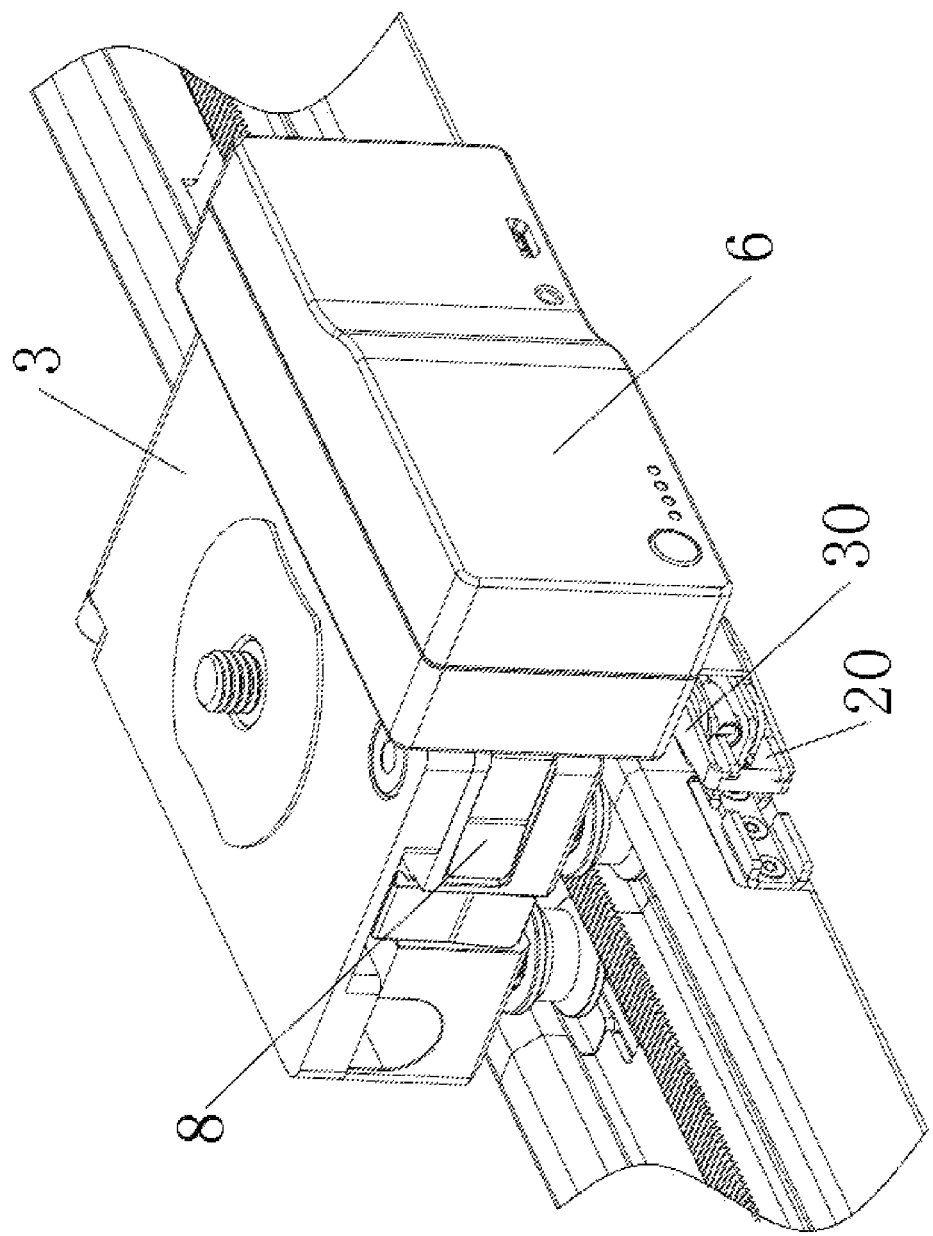
FIG. 7 is a perspective view of an electric module when the embodiment of the present invention is converted into the automatic mode.
Figure 11:
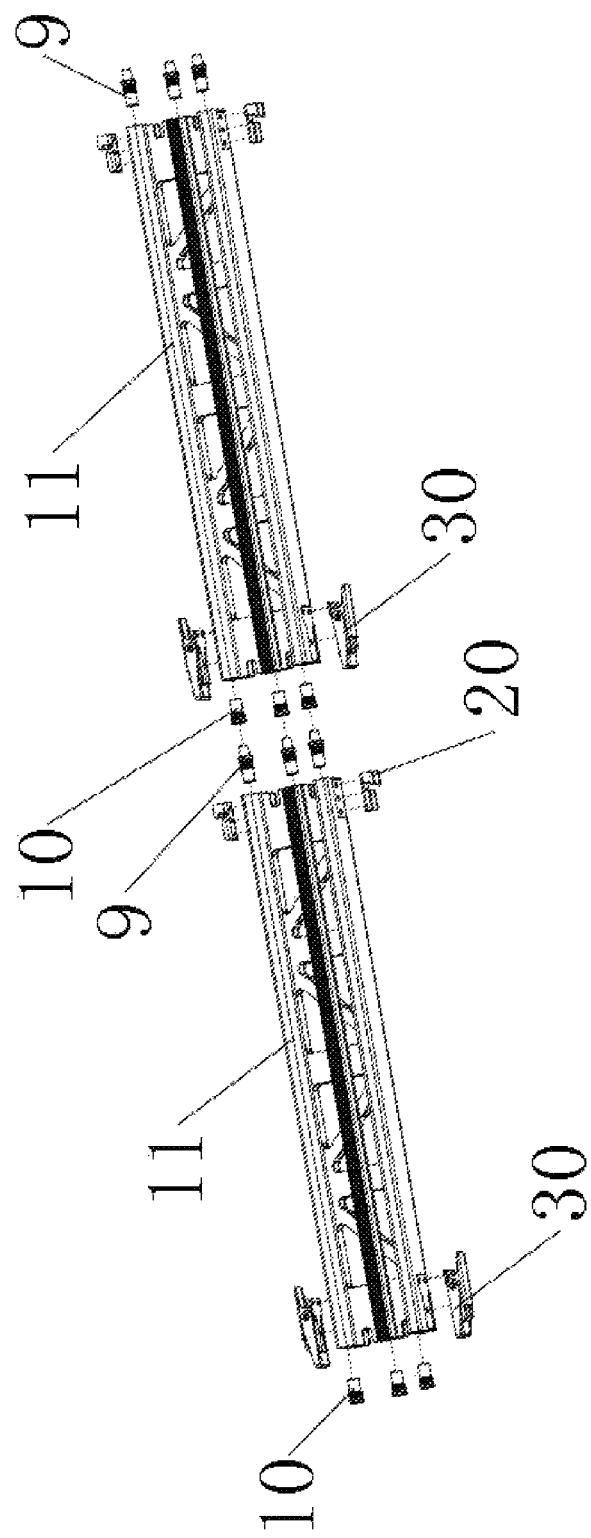
FIG. 11 is an installation diagram of rail units of the embodiment of the present invention.

In this embodiment, the bracket module 2 is connected with the rail through at least two sets of male-female butt joints 9, 10 and two pairs of male-female butt buckles 20, 30, as shown in FIG. 1, FIG. 6 and FIG. 11.

The above are merely preferred embodiments of the present invention and are not intended to limit the implementation scope of the disclosure. All equivalent changes and modifications made according to the content within the patent scope claimed by the disclosure are intended to be included in the technical scope of the disclosure.

What is claimed is:

1. A transmission mode fast-conversion structure for a photographic sliding rail, comprising an elongated rail (1), bracket modules (2) mounted on two ends of the rail (1), a sliding block module (3) slidable on the rail (1), a sliding block transmission structure (4), a flywheel module (5) and an electric module (6), wherein, a flywheel lock catch structure (7) and an electric module lock catch structure (8) are arranged in the front side surface of the sliding block module (3);

the sliding block transmission structure (4) is arranged in the sliding block module (3) and comprises a gear rack (41) arranged on the bottom surface of the rail (1), a gearbox (42) arranged inside the sliding block module (3), and a gear (43) exposed to the outside of the bottom part of the gearbox (42) and engaged with the gear rack (41); an output shaft of the gearbox (42) is exposed to an open slot of the sliding block module (3) and mounted with a claw disc type gearbox coupling (421);

a claw disc type flywheel coupling (51) capable of being engaged with and butting with the claw disc of the gearbox coupling (421) is provided on the flywheel module (5); a flywheel securing buckle (52) capable of being buckled with the flywheel lock catch structure (7) is arranged on a side of the flywheel module (5) opposite to the sliding block module (3);

a claw disc type electric coupling (61) capable of being engaged with and butting with the claw disc of the gearbox coupling (421) is provided on a drive shaft of the electric module (6); an electric module securing buckle (62) capable of being buckled with the electric module lock catch structure (8) is arranged on a surface of the electric module (6) opposite to the sliding block module (3).

2. The transmission mode fast-conversion structure for a photographic sliding rail according to claim 1, wherein the flywheel lock catch structure (7) comprises a flywheel securing buckle lock pin (71) and a flywheel securing buckle lock pin reset spring (72) for making the flywheel securing buckle lock pin (71) reset outwardly; the flywheel securing buckle lock pin (71) and the flywheel securing buckle lock pin reset spring (72) are arranged in a transverse slot of the sliding block module (3), a front side surface of the sliding block module (3) defines a flywheel securing buckle insertion hole (32) allowing the flywheel securing buckle (52) to insert to hook the flywheel securing buckle lock pin (71).

3. The transmission mode fast-conversion structure for a photographic sliding rail according to claim 2, wherein the rail (1) is formed by butting at least two sections of rail units (11), the gear rack (41) is divided into a plurality of sections that are respectively arranged on the rail unit (11), and the gear racks on the opposite ends of adjacent rail units (11) are butted together, adjacent rail units (11) are butted together through at least two pairs of male-female butt joints (9, 10) engaged together, and at least two pairs of male-female butt buckles (20, 30) are further provided on adjacent rail units (11).

4. The transmission mode fast-conversion structure for a photographic sliding rail according to claim 3, wherein the bracket module (2) is connected with the rail through the male-female butt joints (9, 10) and the male-female butt buckles (20, 30).

5. The transmission mode fast-conversion structure for a photographic sliding rail according to claim 1, wherein the electric module lock catch structure (8) comprises an electric module lock hook (81) horizontally swingingly connected to the sliding block module (3) and a lock hook reset spring (82).

6. The transmission mode fast-conversion structure for a photographic sliding rail according to claim 5, wherein the rail (1) is formed by butting at least two sections of rail units (11), the gear rack (41) is divided into a plurality of sections that are respectively arranged on the rail unit (11), and the gear racks on the opposite ends of adjacent rail units (11) are butted together, adjacent rail units (11) are butted together through at least two pairs of male-female butt joints (9, 10) engaged together, and at least two pairs of male-female butt buckles (20, 30) are further provided on adjacent rail units (11).

7. The transmission mode fast-conversion structure for a photographic sliding rail according to claim 6, wherein the bracket module (2) is connected with the rail through the male-female butt joints (9, 10) and the male-female butt buckles (20, 30).

8. The transmission mode fast-conversion structure for a photographic sliding rail according to claim 1, wherein the rail (1) is formed by butting at least two sections of rail units (11), the gear rack (41) is divided into a plurality of sections that are respectively arranged on the rail unit (11), and the gear racks on the opposite ends of adjacent rail units (11) are butted together, adjacent rail units (11) are butted together through at least two pairs of male-female butt joints (9, 10)

engaged together, and at least two pairs of male-female butt buckles (20, 30) are further provided on adjacent rail units (11).

9. The transmission mode fast-conversion structure for a photographic sliding rail according to claim 8, wherein the bracket module (2) is connected with the rail through the male-female butt joints (9, 10) and the male-female butt buckles (20, 30).

\* \* \* \* \*